United States Patent
Ferguson et al.

(10) Patent No.: US 11,079,768 B2
(45) Date of Patent: *Aug. 3, 2021

(54) USE OF A REFERENCE IMAGE TO DETECT A ROAD OBSTACLE

(71) Applicant: Waymo LLC, Mountain View, CA (US)

(72) Inventors: David Ian Ferguson, San Francisco, CA (US); Jiajun Zhu, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/896,203

(22) Filed: Jun. 8, 2020

(65) Prior Publication Data

US 2020/0301440 A1    Sep. 24, 2020

Related U.S. Application Data

(63) Continuation of application No. 15/090,089, filed on Apr. 4, 2016, now Pat. No. 10,678,259, which is a
(Continued)

(51) Int. Cl.
*G05D 1/02* (2020.01)
*G06K 9/00* (2006.01)
*G06T 7/00* (2017.01)

(52) U.S. Cl.
CPC ......... *G05D 1/0253* (2013.01); *G05D 1/0248* (2013.01); *G05D 1/0257* (2013.01);
(Continued)

(58) Field of Classification Search
None
See application file for complete search history.

(56) References Cited

U.S. PATENT DOCUMENTS 5,522,018 A * 5/1996 Takeda .................. G06T 15/405
345/422
5,642,093 A * 6/1997 Kinoshita ............ B60K 28/066
180/167
(Continued)

OTHER PUBLICATIONS

Wang, Dongsheng & Feng, Tao & Shum, Heung-Yeung & Ma, Songde. (2002). A novel probability model for background maintenance and subtraction. (Year: 2002).*
(Continued)

*Primary Examiner* — Stefan Gadomski
(74) *Attorney, Agent, or Firm* — McDonnell Boehnen Hulbert & Berghoff LLP

(57) ABSTRACT

Methods and systems for use of a reference image to detect a road obstacle are described. A computing device configured to control a vehicle, may be configured to receive, from an image-capture device, an image of a road on which the vehicle is travelling. The computing device may be configured to compare the image to a reference image; and identify a difference between the image and the reference image. Further, the computing device may be configured to determine a level of confidence for identification of the difference. Based on the difference and the level of confidence, the computing device may be configured to modify a control strategy associated with a driving behavior of the vehicle; and control the vehicle based on the modified control strategy.

20 Claims, 5 Drawing Sheets

Related U.S. Application Data continuation of application No. 13/613,016, filed on Sep. 13, 2012, now abandoned.

(52) U.S. Cl.
CPC .......... *G06K 9/00805* (2013.01); *G06T 7/001* (2013.01); *G05D 2201/02* (2013.01)

(56) References Cited

U.S. PATENT DOCUMENTS

| | | | | |
|---|---|---|---|---|
| 5,684,898 A * | 11/1997 | Brady | G08G 1/04 | 382/282 |
| 6,281,806 B1 * | 8/2001 | Smith | B60Q 1/085 | 340/901 |
| 6,335,985 B1 * | 1/2002 | Sambonsugi | G06K 9/3241 | 382/190 |
| 2002/0041698 A1 * | 4/2002 | Ito | G06T 7/254 | 382/103 |
| 2002/0044607 A1 * | 4/2002 | Koga | G06T 7/254 | 375/240.16 |
| 2003/0058237 A1 * | 3/2003 | Lee | G08B 13/1968 | 345/418 |
| 2003/0210807 A1 * | 11/2003 | Sato | G08G 1/166 | 382/104 |
| 2004/0001612 A1 * | 1/2004 | Gutta | G06K 9/38 | 382/107 |
| 2004/0042638 A1 * | 3/2004 | Iwano | G06K 9/00798 | 382/104 |
| 2004/0056950 A1 * | 3/2004 | Takeda | G08G 1/166 | 348/92 |
| 2004/0175041 A1 * | 9/2004 | Miller | G06K 9/00288 | 382/190 |
| 2005/0002558 A1 * | 1/2005 | Franke | G08G 1/123 | 382/154 |
| 2005/0286764 A1 * | 12/2005 | Mittal | G06K 9/6247 | 382/181 |
| 2006/0013438 A1 * | 1/2006 | Kubota | G06K 9/00805 | 382/103 |
| 2006/0034519 A1 * | 2/2006 | Toyama | G06T 7/11 | 382/224 |
| 2006/0111841 A1 * | 5/2006 | Tseng | B60R 1/00 | 701/301 |
| 2006/0114318 A1 * | 6/2006 | Saka | G03B 43/00 | 348/61 |
| 2006/0115121 A1 * | 6/2006 | Saka | G06T 7/0002 | 382/104 |
| 2006/0149455 A1 * | 7/2006 | Sawada | B60T 7/22 | 701/96 |
| 2006/0177099 A1 * | 8/2006 | Zhu | G06K 9/00664 | 382/104 |
| 2007/0031037 A1 * | 2/2007 | Blake | G06T 7/194 | 382/173 |
| 2008/0069400 A1 * | 3/2008 | Zhu | G06K 9/00825 | 382/103 |
| 2008/0118161 A1 * | 5/2008 | Liu | G06K 9/6269 | 382/228 |
| 2008/0205702 A1 * | 8/2008 | Nakashima | G06K 9/00785 | 382/103 |
| 2008/0278576 A1 * | 11/2008 | Nishigaki | G06T 7/246 | 348/94 |
| 2008/0304735 A1 * | 12/2008 | Yang | G06T 7/11 | 382/164 |
| 2009/0005959 A1 * | 1/2009 | Bargman | G08G 1/166 | 701/117 |
| 2009/0066802 A1 * | 3/2009 | Itagaki | G06K 9/00785 | 348/222.1 |
| 2009/0110236 A1 * | 4/2009 | Huang | G06T 7/277 | 382/103 |
| 2009/0190798 A1 * | 7/2009 | Lee | G06K 9/6292 | 382/103 |
| 2009/0245657 A1 * | 10/2009 | Osugi | G06K 9/00791 | 382/209 |
| 2009/0304231 A1 * | 12/2009 | Lu | G06K 9/4628 | 382/103 |
| 2010/0004810 A1 * | 1/2010 | Tagawa | G01C 21/26 | 701/28 |
| 2010/0076684 A1 * | 3/2010 | Schiffmann | G01S 13/726 | 701/301 |
| 2010/0104138 A1 * | 4/2010 | Fardi | G06T 7/70 | 382/106 |
| 2011/0052002 A1 * | 3/2011 | Cobb | G06K 9/00771 | 382/103 |
| 2011/0116682 A1 * | 5/2011 | Wang | G06T 7/44 | 382/103 |
| 2011/0216201 A1 * | 9/2011 | McAndrew | G06T 7/80 | 348/148 |
| 2011/0243451 A1 * | 10/2011 | Oyaizu | G06T 5/50 | 382/190 |
| 2011/0251768 A1 * | 10/2011 | Luo | G08G 1/16 | 701/70 |
| 2012/0027297 A1 * | 2/2012 | Feris | G06T 7/11 | 382/173 |
| 2012/0051593 A1 * | 3/2012 | Tojo | G06T 7/254 | 382/103 |
| 2012/0140066 A1 * | 6/2012 | Lin | H04N 7/18 | 348/143 |
| 2012/0155764 A1 * | 6/2012 | Ogura | G06T 7/254 | 382/171 |
| 2012/0194677 A1 * | 8/2012 | Suzuki | G06K 9/00798 | 348/148 |
| 2012/0230589 A1 * | 9/2012 | Baba | G06F 16/7837 | 382/192 |
| 2013/0027550 A1 * | 1/2013 | Evangelio | G06T 7/254 | 348/143 |

OTHER PUBLICATIONS

Toyama, Kentaro & Krumm, John & Brumitt, Barry & Meyers, Brian. (1999). Wallflower: Principles and practice of background maintenance. Proceedings of IEEE ICCV, vol. 1. 1. 255-261 vol. 1. 10.1109/ICCV.1999.791228 (Year: 1999).*

Robson, "Let's Enhance", uploaded Dec. 13, 2009, available at https://www.youtube.com/watch?v=Vxq9yj2pVWk. (Year: 2009).*

Kyutoku, Haruya et al., "On-Road Obstacle Detection by Comparing Present and Past In-Vehicle Camera Images", MVA2011 IAPR Conference on Machine Vision Applications, Jun. 13-15, 2011, Nara Japan, pp. 357-360. (Year: 2011).*

Fisher, "Thresholding", HIPR2 Image Processing Learning Resources, Pub. 2003, available at http://homepages.inf.ed.ac.uk/rbf/HIPR2/threshld.htm, 7 pages. (Year: 2003).*

* cited by examiner

COMPUTER PROGRAM PRODUCT 500

SIGNAL BEARING MEDIUM 501

PROGRAM INSTRUCTIONS 502

- RECEIVING, AT A COMPUTING DEVICE CONFIGURED TO CONTROL A VEHICLE, FROM A CAMERA COUPLED TO THE VEHICLE, AN IMAGE OF A ROAD ON WHICH THE VEHICLE IS TRAVELLING, AND THE COMPUTING DEVICE MAY HAVE ACCESS TO A REFERENCE IMAGE OF THE ROAD

- COMPARING THE IMAGE TO THE REFERENCE IMAGE

- IDENTIFYING, BASED ON THE COMPARING, A DIFFERENCE BETWEEN THE IMAGE AND THE REFERENCE IMAGE

- DETERMINING A LEVEL OF CONFIDENCE FOR IDENTIFICATION OF THE DIFFERENCE

- MODIFYING, USING THE COMPUTING DEVICE, A CONTROL STRATEGY ASSOCIATED WITH A DRIVING BEHAVIOR OF THE VEHICLE, BASED ON THE DIFFERENCE AND THE LEVEL OF CONFIDENCE

- CONTROLLING, USING THE COMPUTING DEVICE, THE VEHICLE BASED ON THE MODIFIED CONTROL STRATEGY

| COMPUTER READABLE MEDIUM 503 | COMPUTER RECORDABLE MEDIUM 504 | COMMUNICATIONS MEDIUM 505 |

USE OF A REFERENCE IMAGE TO DETECT A ROAD OBSTACLE

CROSS-REFERENCE TO RELATED APPLICATION

The present application is a continuation patent application claiming priority to U.S. patent application Ser. No. 15/090,089 filed Apr. 4, 2016, which is a continuation of U.S. application Ser. No. 13/613,016 filed Sep. 13, 2012. The contents of these applications are hereby incorporated by reference in their entirety.

BACKGROUND

Autonomous vehicles use various computing systems to aid in transporting passengers from one location to another. Some autonomous vehicles may require some initial input or continuous input from an operator, such as a pilot, driver, or passenger. Other systems, for example autopilot systems, may be used only when the system has been engaged, which permits the operator to switch from a manual mode (where the operator exercises a high degree of control over the movement of the vehicle) to an autonomous mode (where the vehicle essentially drives itself) to modes that lie somewhere in between.

SUMMARY

The present application discloses embodiments that relate to use of a reference image to detect a road obstacle. In one aspect, the present application describes a method. The method may comprise receiving, at a computing device configured to control a vehicle, from a camera coupled to the vehicle, an image of a road on which the vehicle is travelling. The computing device may have access to a reference image of the road. The method also may comprise comparing the image to the reference image. The method further may comprise identifying, based on the comparing, a difference between the image and the reference image. The method also may comprise determining a level of confidence for identification of the difference. The method further may comprise modifying, using the computing device, a control strategy associated with a driving behavior of the vehicle, based on the difference and the level of confidence; and controlling, using the computing device, the vehicle based on the modified control strategy.

In another aspect, the present application describes a non-transitory computer readable medium having stored thereon instructions executable by a computing device to cause the computing device to perform functions. The functions may comprise receiving, from a camera coupled to a vehicle, an image of a road on which the vehicle is travelling. The functions also may comprise comparing the image to a reference image. The functions further may comprise identifying, based on the comparing, a difference between the image and the reference image. The functions also may comprise determining a level of confidence for identification of the difference. The functions further may comprise modifying a control strategy associated with a driving behavior of the vehicle, based on the difference and the level of confidence; and controlling the vehicle based on the modified control strategy.

In still another aspect, the present application describes a control system for a vehicle. The control system may comprise an image-capture device. The control system also may comprise a computing device in communication with the image capture-device and configured to receive, from the image-capture device, an image of a road on which the vehicle is travelling. The computing device also may be configured to compare the image to a reference image; and identify a difference between the image and the reference image. The computing device further may be configured to determine a level of confidence for identification of the difference. The computing device also may be configured to modify a control strategy associated with a driving behavior of the vehicle, based on the difference and the level of confidence; and control the vehicle based on the modified control strategy.

The foregoing summary is illustrative only and is not intended to be in any way limiting. In addition to the illustrative aspects, embodiments, and features described above, further aspects, embodiments, and features will become apparent by reference to the figures and the following detailed description.

BRIEF DESCRIPTION OF THE FIGURES

FIG. 5 is a schematic illustrating a conceptual partial view of a computer program, in accordance with an example embodiment.

DETAILED DESCRIPTION

The following detailed description describes various features and functions of the disclosed systems and methods with reference to the accompanying figures. In the figures, similar symbols identify similar components, unless context dictates otherwise. The illustrative system and method embodiments described herein are not meant to be limiting. It may be readily understood that certain aspects of the disclosed systems and methods can be arranged and combined in a wide variety of different configurations, all of which are contemplated herein.

An autonomous vehicle operating on a road may rely on detection of moving objects, obstacles, and road changes for navigation. To facilitate such detection, a computing device, configured to control the vehicle, may be configured to receive, from a camera coupled to the vehicle, an image of the road; and compare the image to a reference image that depicts background objects (e.g., static objects). Based on comparing the image to the reference image, the computing device may be configured to subtract the background objects from the image, and identify a difference between the image and the reference image. The difference, for example, may represent one or more foreground objects such as a moving object, an obstacle, or a road change. The computing device may be configured to determine a level of confidence for identification of the difference. Further, the computing device may be configured to modify a control strategy associated with a driving behavior of the vehicle, based on the difference and the level of confidence; and control the vehicle based on the modified control strategy.

An example vehicle control system may be implemented in or may take the form of an automobile. Alternatively, a vehicle control system may be implemented in or take the form of other vehicles, such as cars, trucks, motorcycles, buses, boats, airplanes, helicopters, lawn mowers, recreational vehicles, amusement park vehicles, farm equipment, construction equipment, trams, golf carts, trains, and trolleys. Other vehicles are possible as well.

Further, an example system may take the form of a non-transitory computer-readable medium, which has program instructions stored thereon that are executable by at least one processor to provide the functionality described herein. An example system may also take the form of an automobile or a subsystem of an automobile that includes such a non-transitory computer-readable medium having such program instructions stored thereon.

Figure 1:
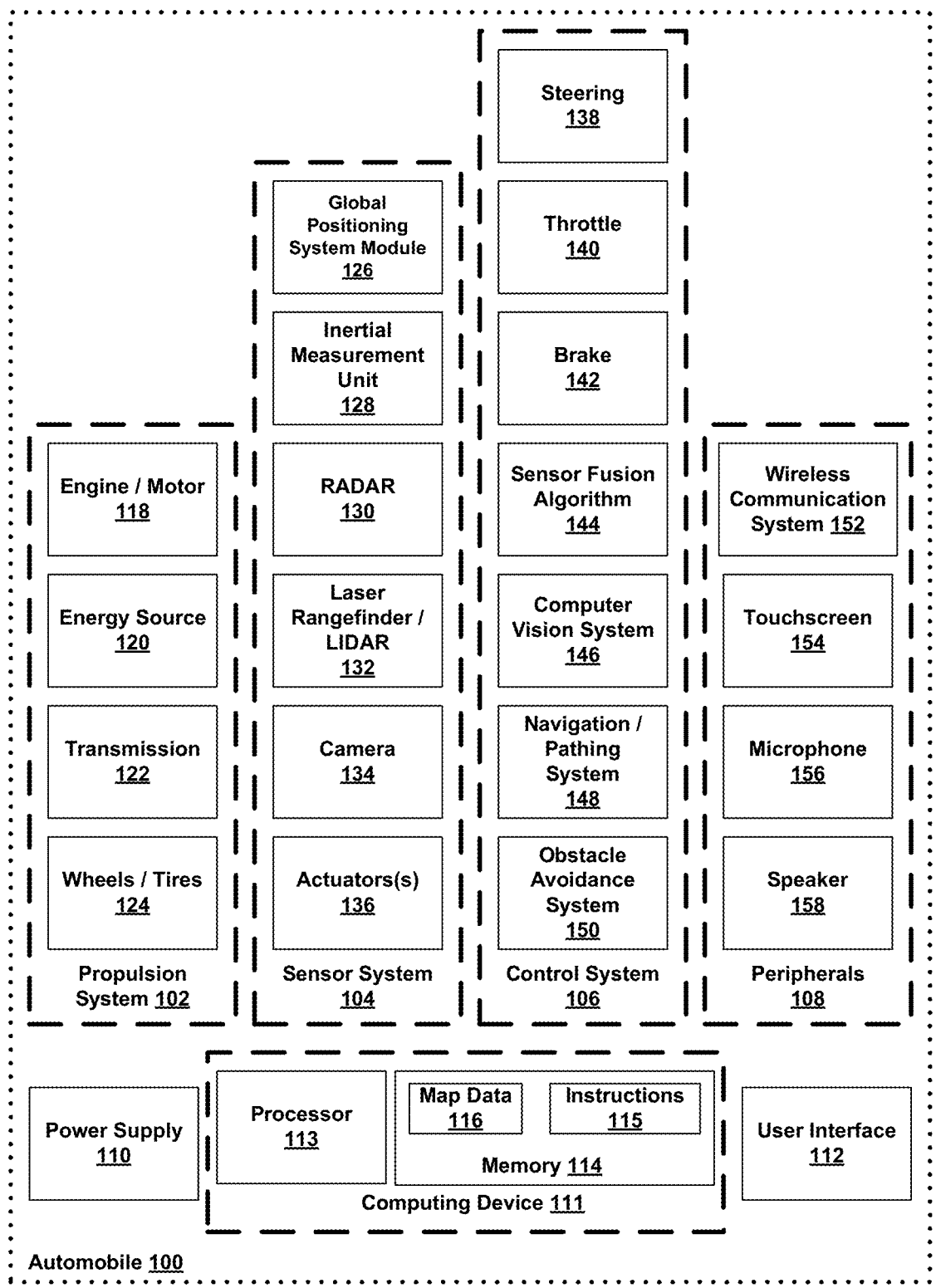
FIG. 1 is a simplified block diagram of an example automobile, in accordance with an example embodiment.

Referring now to the Figures, FIG. 1 is a simplified block diagram of an example automobile 100, in accordance with an example embodiment. Components coupled to or included in the automobile 100 may include a propulsion system 102, a sensor system 104, a control system 106, peripherals 108, a power supply 110, a computing device 111, and a user interface 112. The computing device 111 may include a processor 113, and a memory 114. The memory 114 may include instructions 115 executable by the processor 113, and may also store map data 116. Components of the automobile 100 may be configured to work in an interconnected fashion with each other and/or with other components coupled to respective systems. For example, the power supply 110 may provide power to all the components of the automobile 100. The computing device 111 may be configured to receive information from and control the propulsion system 102, the sensor system 104, the control system 106, and the peripherals 108. The computing device 111 may be configured to generate a display of images on and receive inputs from the user interface 112.

In other examples, the automobile 100 may include more, fewer, or different systems, and each system may include more, fewer, or different components. Additionally, the systems and components shown may be combined or divided in any number of ways.

The propulsion system 102 may may be configured to provide powered motion for the automobile 100. As shown, the propulsion system 102 includes an engine/motor 118, an energy source 120, a transmission 122, and wheels/tires 124.

The engine/motor 118 may be or include any combination of an internal combustion engine, an electric motor, a steam engine, and a Stirling engine. Other motors and engines are possible as well. In some examples, the propulsion system 102 could include multiple types of engines and/or motors. For instance, a gas-electric hybrid car could include a gasoline engine and an electric motor. Other examples are possible.

The energy source 120 may be a source of energy that powers the engine/motor 118 in full or in part. That is, the engine/motor 118 may be configured to convert the energy source 120 into mechanical energy. Examples of energy sources 120 include gasoline, diesel, other petroleum-based fuels, propane, other compressed gas-based fuels, ethanol, solar panels, batteries, and other sources of electrical power. The energy source(s) 120 could additionally or alternatively include any combination of fuel tanks, batteries, capacitors, and/or flywheels. In some examples, the energy source 120 may provide energy for other systems of the automobile 100 as well.

The transmission 122 may be configured to transmit mechanical power from the engine/motor 118 to the wheels/tires 124. To this end, the transmission 122 may include a gearbox, clutch, differential, drive shafts, and/or other elements. In examples where the transmission 122 includes drive shafts, the drive shafts could include one or more axles that are configured to be coupled to the wheels/tires 124.

The wheels/tires 124 of automobile 100 could be configured in various formats, including a unicycle, bicycle/motorcycle, tricycle, or car/truck four-wheel format. Other wheel/tire formats are possible as well, such as those including six or more wheels. The wheels/tires 124 of automobile 100 may be configured to rotate differentially with respect to other wheels/tires 124. In some examples, the wheels/tires 124 may include at least one wheel that is fixedly attached to the transmission 122 and at least one tire coupled to a rim of the wheel that could make contact with the driving surface. The wheels/tires 124 may include any combination of metal and rubber, or combination of other materials.

The propulsion system 102 may additionally or alternatively include components other than those shown.

The sensor system 104 may include a number of sensors configured to sense information about an environment in which the automobile 100 is located. As shown, the sensors of the sensor system include a Global Positioning System (GPS) module 126, an inertial measurement unit (IMU) 128, a radio detection and ranging (RADAR) unit 130, a laser rangefinder and/or light detection and ranging (LIDAR) unit 132, a camera 134, and actuators 136 configured to modify a position and/or orientation of the sensors. The sensor system 104 may include additional sensors as well, including, for example, sensors that monitor internal systems of the automobile 100 (e.g., an $O_2$ monitor, a fuel gauge, an engine oil temperature, etc.). Other sensors are possible as well.

The GPS module 126 may be any sensor configured to estimate a geographic location of the automobile 100. To this end, the GPS module 126 may include a transceiver configured to estimate a position of the automobile 100 with respect to the Earth, based on satellite-based positioning data. In an example, the computing device 111 may be configured to use the GPS module 126 in combination with the map data 116 to estimate a location of a lane boundary on road on which the automobile 100 may be travelling on. The GPS module 126 may take other forms as well.

The IMU 128 may be any combination of sensors configured to sense position and orientation changes of the automobile 100 based on inertial acceleration. In some examples, the combination of sensors may include, for example, accelerometers and gyroscopes. Other combinations of sensors are possible as well.

The RADAR unit 130 may be considered as an object detection system that may be configured to use radio waves to determine characteristics of the object such as range, altitude, direction, or speed of the object. The RADAR unit 130 may be configured to transmit pulses of radio waves or microwaves that may bounce off any object in a path of the waves. The object may return a part of energy of the waves to a receiver (e.g., dish or antenna), which may be part of the RADAR unit 130 as well. The RADAR unit 130 also may be configured to perform digital signal processing of received signals (bouncing off the object) and may be configured to identify the object.

Other systems similar to RADAR have been used in other parts of the electromagnetic spectrum. One example is LIDAR (light detection and ranging), which may be configured to use visible light from lasers rather than radio waves.

The LIDAR unit 132 may include a sensor configured to sense or detect objects in an environment in which the automobile 100 is located using light. Generally, LIDAR is an optical remote sensing technology that can measure distance to, or other properties of, a target by illuminating the target with light. As an example, the LIDAR unit 132 may include a laser source and/or laser scanner configured to emit laser pulses and a detector configured to receive reflections of the laser pulses. For example, the LIDAR unit 132 may include a laser range finder reflected by a rotating mirror, and the laser is scanned around a scene being digitized, in one or two dimensions, gathering distance measurements at specified angle intervals. In examples, the LIDAR unit 132 may include components such as light (e.g., laser) source, scanner and optics, photo-detector and receiver electronics, and position and navigation system.

In an example, The LIDAR unit 132 may be configured to use ultraviolet (UV), visible, or infrared light to image objects and can be used with a wide range of targets, including non-metallic objects. In one example, a narrow laser beam can be used to map physical features of an object with high resolution.

In examples, wavelengths in a range from about 10 micrometers (infrared) to about 250 nm (UV) could be used. Typically light is reflected via backscattering. Different types of scattering are used for different LIDAR applications, such as Rayleigh scattering, Mie scattering and Raman scattering, as well as fluorescence. Based on different kinds of backscattering, LIDAR can be accordingly called Rayleigh LIDAR, Mie LIDAR, Raman LIDAR and Na/Fe/K Fluorescence LIDAR, as examples. Suitable combinations of wavelengths can allow for remote mapping of objects by looking for wavelength-dependent changes in intensity of reflected signals, for example.

Three-dimensional (3D) imaging can be achieved using both scanning and non-scanning LIDAR systems. "3D gated viewing laser radar" is an example of a non-scanning laser ranging system that applies a pulsed laser and a fast gated camera. Imaging LIDAR can also be performed using an array of high speed detectors and a modulation sensitive detectors array typically built on single chips using CMOS (complementary metal-oxide-semiconductor) and hybrid CMOS/CCD (charge-coupled device) fabrication techniques. In these devices, each pixel may be processed locally by demodulation or gating at high speed such that the array can be processed to represent an image from a camera. Using this technique, many thousands of pixels may be acquired simultaneously to create a 3D point cloud representing an object or scene being detected by the LIDAR unit 132.

A point cloud may include a set of vertices in a 3D coordinate system. These vertices may be defined by X, Y, and Z coordinates, for example, and may represent an external surface of an object. The LIDAR unit 132 may be configured to create the point cloud by measuring a large number of points on the surface of the object, and may output the point cloud as a data file. As the result of a 3D scanning process of the object by the LIDAR unit 132, the point cloud can be used to identify and visualize the object.

In one example, the point cloud can be directly rendered to visualize the object. In another example, the point cloud may be converted to polygon or triangle mesh models through a process that may be referred to as surface reconstruction. Example techniques for converting a point cloud to a 3D surface may include Delaunay triangulation, alpha shapes, and ball pivoting. These techniques include building a network of triangles over existing vertices of the point cloud. Other example techniques may include converting the point cloud into a volumetric distance field and reconstructing an implicit surface so defined through a marching cubes algorithm.

The camera 134 may be any camera (e.g., a still camera, a video camera, etc.) configured to capture images of the environment in which the automobile 100 is located. To this end, the camera may be configured to detect visible light, or may be configured to detect light from other portions of the spectrum, such as infrared or ultraviolet light. Other types of cameras are possible as well. The camera 134 may be a two-dimensional detector, or may have a three-dimensional spatial range. In some examples, the camera 134 may be, for example, a range detector configured to generate a two-dimensional image indicating a distance from the camera 134 to a number of points in the environment. To this end, the camera 134 may use one or more range detecting techniques. For example, the camera 134 may be configured to use a structured light technique in which the automobile 100 illuminates an object in the environment with a predetermined light pattern, such as a grid or checkerboard pattern and uses the camera 134 to detect a reflection of the predetermined light pattern off the object. Based on distortions in the reflected light pattern, the automobile 100 may be configured to determine the distance to the points on the object. The predetermined light pattern may comprise infrared light, or light of another wavelength.

The actuators 136 may, for example, be configured to modify a position and/or orientation of the sensors.

The sensor system 104 may additionally or alternatively include components other than those shown.

The control system 106 may be configured to control operation of the automobile 100 and its components. To this end, the control system 106 may include a steering unit 138, a throttle 140, a brake unit 142, a sensor fusion algorithm 144, a computer vision system 146, a navigation or pathing system 148, and an obstacle avoidance system 150.

The steering unit 138 may be any combination of mechanisms configured to adjust the heading or direction of the automobile 100.

The throttle 140 may be any combination of mechanisms configured to control the operating speed and acceleration of the engine/motor 118 and, in turn, the speed and acceleration of the automobile 100.

The brake unit 142 may be any combination of mechanisms configured to decelerate the automobile 100. For example, the brake unit 142 may use friction to slow the wheels/tires 124. As another example, the brake unit 142 may be configured to be regenerative and convert the kinetic energy of the wheels/tires 124 to electric current. The brake unit 142 may take other forms as well.

The sensor fusion algorithm 144 may include an algorithm (or a computer program product storing an algorithm) executable by the computing device 111, for example. The sensor fusion algorithm 144 may be configured to accept data from the sensor system 104 as an input. The data may include, for example, data representing information sensed at the sensors of the sensor system 104. The sensor fusion algorithm 144 may include, for example, a Kalman filter, a Bayesian network, or another algorithm. The sensor fusion algorithm 144 further may be configured to provide various assessments based on the data from the sensor system 104, including, for example, evaluations of individual objects and/or features in the environment in which the automobile 100 is located, evaluations of particular situations, and/or evaluations of possible impacts based on particular situations. Other assessments are possible as well The computer vision system 146 may be any system configured to process and analyze images captured by the camera 134 in order to identify objects and/or features in the environment in which the automobile 100 is located, including, for example, lane information, traffic signals and obstacles. To this end, the computer vision system 146 may use an object recognition algorithm, a Structure from Motion (SFM) algorithm, video tracking, or other computer vision techniques. In some examples, the computer vision system 146 may additionally be configured to map the environment, track objects, estimate speed of objects, etc.

The navigation and pathing system 148 may be any system configured to determine a driving path for the automobile 100. The navigation and pathing system 148 may additionally be configured to update the driving path dynamically while the automobile 100 is in operation. In some examples, the navigation and pathing system 148 may be configured to incorporate data from the sensor fusion algorithm 144, the GPS module 126, and one or more predetermined maps so as to determine the driving path for the automobile 100.

The obstacle avoidance system 150 may be any system configured to identify, evaluate, and avoid or otherwise negotiate obstacles in the environment in which the automobile 100 is located.

The control system 106 may additionally or alternatively include components other than those shown.

Peripherals 108 may be configured to allow the automobile 100 to interact with external sensors, other automobiles, and/or a user. To this end, the peripherals 108 may include, for example, a wireless communication system 152, a touchscreen 154, a microphone 156, and/or a speaker 158.

The wireless communication system 152 may be any system configured to be wirelessly coupled to one or more other automobiles, sensors, or other entities, either directly or via a communication network. To this end, the wireless communication system 152 may include an antenna and a chipset for communicating with the other automobiles, sensors, or other entities either directly or over an air interface. The chipset or wireless communication system 152 in general may be arranged to communicate according to one or more other types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 152 may take other forms as well.

The touchscreen 154 may be used by a user to input commands to the automobile 100. To this end, the touchscreen 154 may be configured to sense at least one of a position and a movement of a user's finger via capacitive sensing, resistance sensing, or a surface acoustic wave process, among other possibilities. The touchscreen 154 may be capable of sensing finger movement in a direction parallel or planar to the touchscreen surface, in a direction normal to the touchscreen surface, or both, and may also be capable of sensing a level of pressure applied to the touchscreen surface. The touchscreen 154 may be formed of one or more translucent or transparent insulating layers and one or more translucent or transparent conducting layers. The touchscreen 154 may take other forms as well.

The microphone 156 may be configured to receive audio (e.g., a voice command or other audio input) from a user of the automobile 100. Similarly, the speakers 158 may be configured to output audio to the user of the automobile 100.

The peripherals 108 may additionally or alternatively include components other than those shown.

The power supply 110 may be configured to provide power to some or all of the components of the automobile 100. To this end, the power supply 110 may include, for example, a rechargeable lithium-ion or lead-acid battery. In some examples, one or more banks of batteries could be configured to provide electrical power. Other power supply materials and configurations are possible as well. In some examples, the power supply 110 and energy source 120 may be implemented together, as in some all-electric cars.

The processor 113 included in the computing device 111 may comprise one or more general-purpose processors and/or one or more special-purpose processors (e.g., image processor, digital signal processor, etc.). To the extent that the processor 113 includes more than one processor, such processors could work separately or in combination. The computing device 111 may be configured to control functions of the automobile 100 based on input received through the user interface 112, for example.

The memory 114, in turn, may comprise one or more volatile and/or one or more non-volatile storage components, such as optical, magnetic, and/or organic storage, and the memory 114 may be integrated in whole or in part with the processor 113. The memory 114 may contain the instructions 115 (e.g., program logic) executable by the processor 113 to execute various automobile functions, including any of the functions or methods described herein.

The components of the automobile 100 could be configured to work in an interconnected fashion with other components within and/or outside their respective systems. To this end, the components and systems of the automobile 100 may be communicatively linked together by a system bus, network, and/or other connection mechanism (not shown).

Further, while each of the components and systems is shown to be integrated in the automobile 100, in some examples, one or more components or systems may be removably mounted on or otherwise connected (mechanically or electrically) to the automobile 100 using wired or wireless connections.

The automobile 100 may include one or more elements in addition to or instead of those shown. For example, the automobile 100 may include one or more additional interfaces and/or power supplies. Other additional components are possible as well. In these examples, the memory 114 may further include instructions executable by the processor 113 to control and/or communicate with the additional components.

Figure 2:
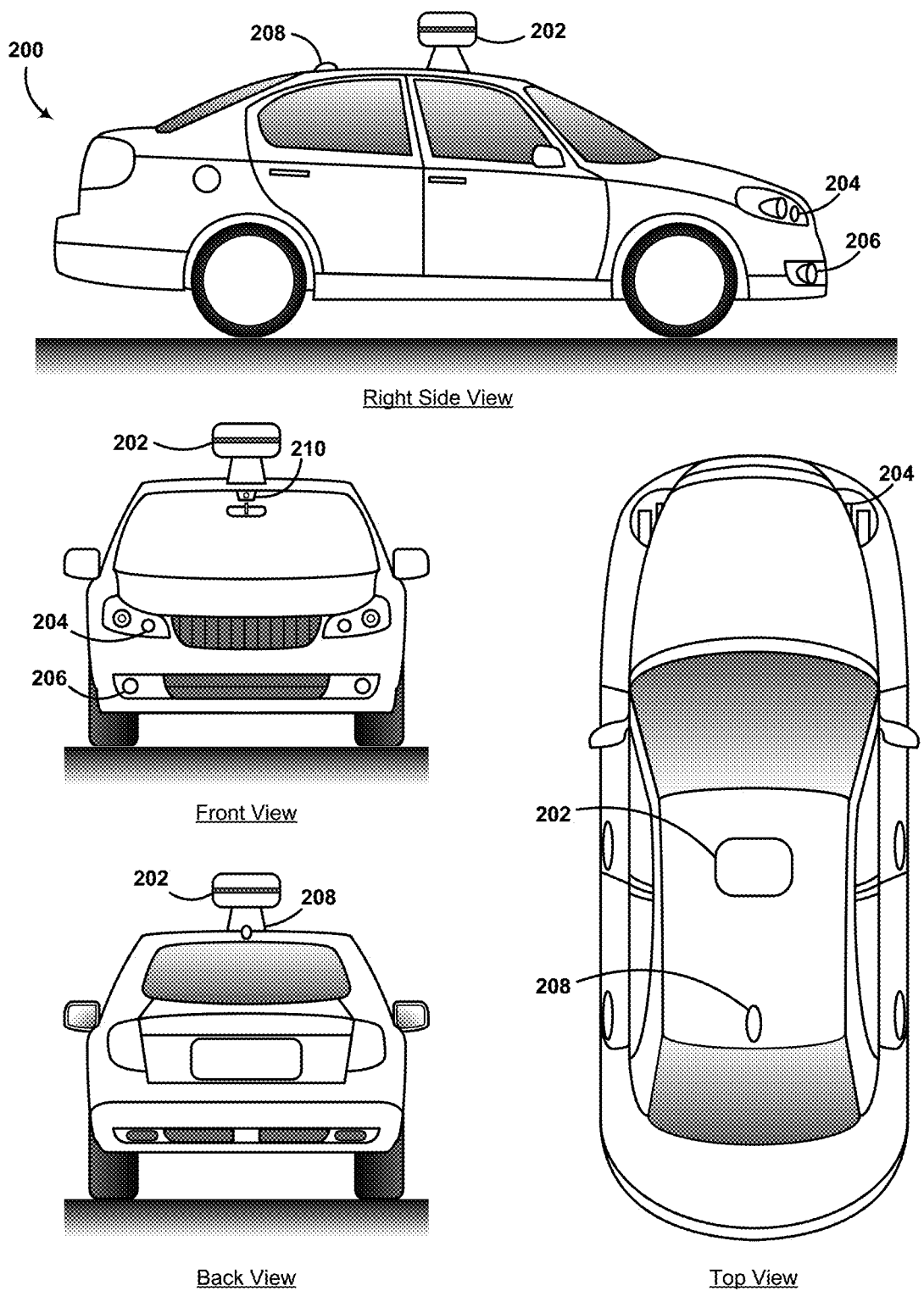
FIG. 2 illustrates an example automobile, in accordance with an example embodiment.

FIG. 2 illustrates an example automobile 200, in accordance with an embodiment. In particular, FIG. 2 shows a Right Side View, Front View, Back View, and Top View of the automobile 200. Although automobile 200 is illustrated in FIG. 2 as a car, other examples are possible. For instance, the automobile 200 could represent a truck, a van, a semi-trailer truck, a motorcycle, a golf cart, an off-road vehicle, or a farm vehicle, among other examples. As shown, the automobile 200 includes a first sensor unit 202, a second sensor unit 204, a third sensor unit 206, a wireless communication system 208, and a camera 210.

Each of the first, second, and third sensor units 202-206 may include any combination of global positioning system sensors, inertial measurement units, RADAR units, LIDAR units, cameras, lane detection sensors, and acoustic sensors. Other types of sensors are possible as well.

While the first, second, and third sensor units 202 are shown to be mounted in particular locations on the automobile 200, in some examples the sensor unit 202 may be mounted elsewhere on the automobile 200, either inside or outside the automobile 200. Further, while only three sensor units are shown, in some examples more or fewer sensor units may be included in the automobile 200.

In some examples, one or more of the first, second, and third sensor units 202-206 may include one or more movable mounts on which the sensors may be movably mounted. The movable mount may include, for example, a rotating platform. Sensors mounted on the rotating platform could be rotated so that the sensors may obtain information from each direction around the automobile 200. Alternatively or additionally, the movable mount may include a tilting platform. Sensors mounted on the tilting platform could be tilted within a particular range of angles and/or azimuths so that the sensors may obtain information from a variety of angles. The movable mount may take other forms as well.

Further, in some examples, one or more of the first, second, and third sensor units 202-206 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

The wireless communication system 208 may be any system configured to wirelessly couple to one or more other automobiles, sensors, or other entities, either directly or via a communication network as described above with respect to the wireless communication system 152 in FIG. 1. While the wireless communication system 208 is shown to be positioned on a roof of the automobile 200, in other examples the wireless communication system 208 could be located, fully or in part, elsewhere.

The camera 210 may be any camera (e.g., a still camera, a video camera, etc.) configured to capture images of the environment in which the automobile 200 is located. To this end, the camera 210 may take any of the forms described above with respect to the camera 134 in FIG. 1. While the camera 210 is shown to be mounted inside a front windshield of the automobile 200, in other examples the camera 210 may be mounted elsewhere on the automobile 200, either inside or outside the automobile 200.

The automobile 200 may include one or more other components in addition to or instead of those shown.

A control system of the automobile 200 may be configured to control the automobile 200 in accordance with a control strategy from among multiple possible control strategies. The control system may be configured to receive information from sensors coupled to the automobile 200 (on or off the automobile 200), modify the control strategy (and an associated driving behavior) based on the information, and control the automobile 200 in accordance with the modified control strategy. The control system further may be configured to monitor the information received from the sensors, and continuously evaluate driving conditions; and also may be configured to modify the control strategy and driving behavior based on changes in the driving conditions.

Figure 3:
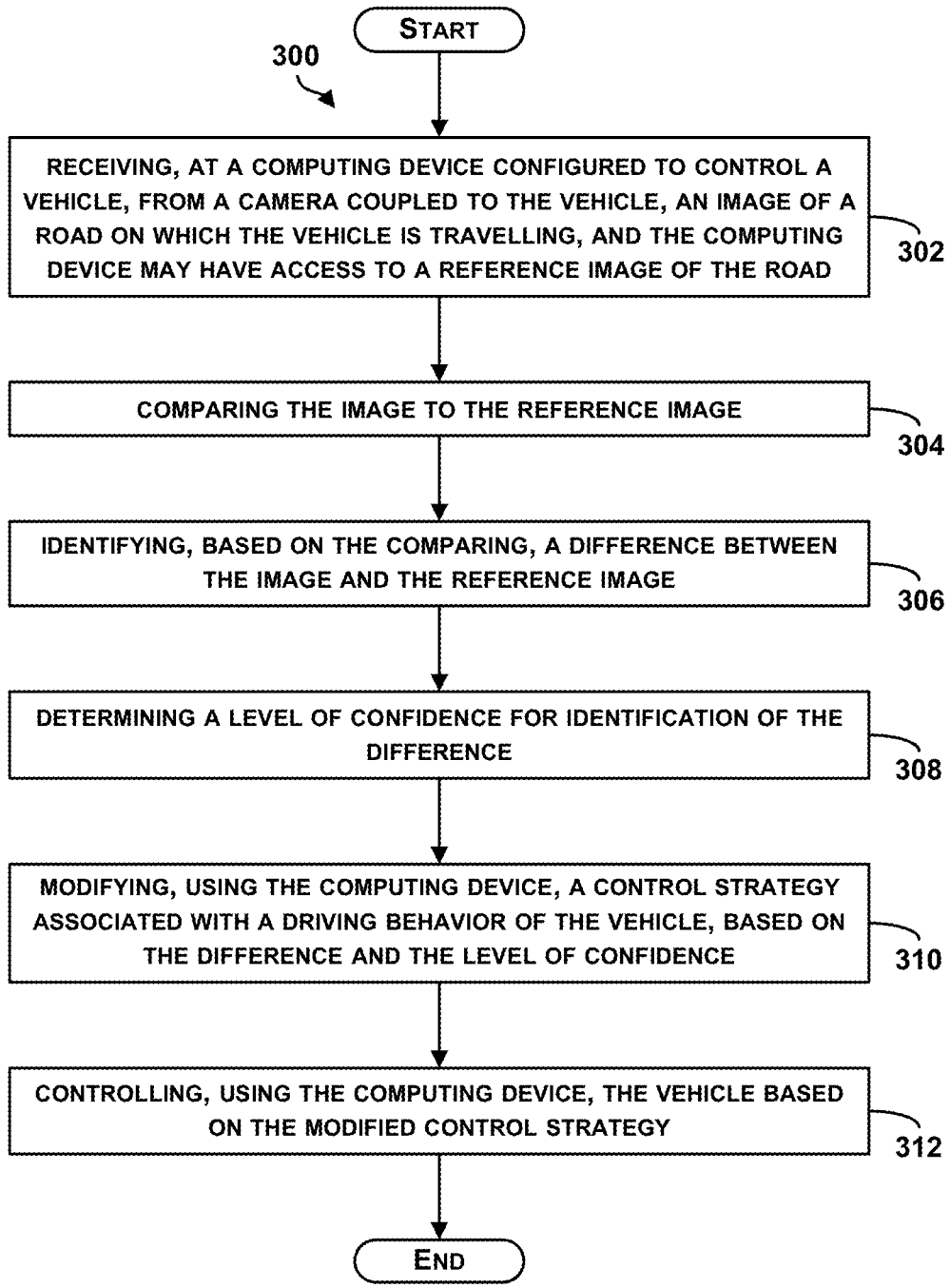
FIG. 3 is a flow chart of a method for use of a reference image to detect a road obstacle, in accordance with an example embodiment.

FIG. 3 is a flow chart of a method 300 for use of a reference image to detect a road obstacle, in accordance with an example embodiment.

The method 300 may include one or more operations, functions, or actions as illustrated by one or more of blocks 302-312. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 300 and other processes and methods disclosed herein, the flowchart shows functionality and operation of one possible implementation of present embodiments. In this regard, each block may represent a module, a segment, or a portion of program code, which includes one or more instructions executable by a processor for implementing specific logical functions or steps in the process. The program code may be stored on any type of computer readable medium or memory, for example, such as a storage device including a disk or hard drive. The computer readable medium may include a non-transitory computer readable medium, for example, such as computer-readable media that stores data for short periods of time like register memory, processor cache and Random Access Memory (RAM). The computer readable medium may also include non-transitory media or memory, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, a tangible storage device, or other article of manufacture, for example.

In addition, for the method 300 and other processes and methods disclosed herein, each block in FIG. 3 may represent circuitry that is wired to perform the specific logical functions in the process.

At block 302, the method 300 includes receiving, at a computing device configured to control a vehicle, from a camera coupled to the vehicle, an image of a road on which the vehicle is travelling, and the computing device may have access to a reference image of the road. The computing device may be onboard the vehicle or may be off-board but in wireless communication with the vehicle, for example. Also, the computing device may be configured to control the vehicle in an autonomous or semi-autonomous operation mode. Also, the computing device may be configured to receive, from sensors coupled to the vehicle, information associated with, for example, condition of systems and subsystems of the vehicle, driving conditions, road conditions, etc. Further, a camera, such as the camera 134 in FIG. 1 or the camera 210 in FIG. 2 or any other image-capture device, may be coupled to the vehicle and may be in communication with the computing device. The camera may be configured to capture images or video of the road and vicinity of the road on which the vehicle is travelling on.

The reference image may have been captured at a previous time by the vehicle or other vehicles, and may be stored on a memory coupled to the computing device, or may be stored at a remote database (e.g., at a server) in communication with the computing device. The reference image may be an obstacle-free image depicting, for example, background objects (e.g., static objects) on the road or in a vicinity of the road.

In examples, the reference image may be determined (i.e., constructed or generated) by pre-processing a plurality of source images captured by the vehicle or other vehicles over time. The plurality of source images may or may not have been captured from the same camera pose. A camera pose may refer to a combination of position and orientation of the camera relative to the road. To construct a single reference image from the plurality of source images, the plurality of source images may be merged (e.g., integrated, aligned, matched, overlapped and compared, etc.) to determine the background objects, and generate the reference image depicting the background objects.

In an example, to merge the plurality of source images, features common to the plurality of source images may be extracted and the background objects may be identified based on the common features. The plurality of source images can then be combined to construct the reference image depicting the background objects.

In some examples, respective source images of the plurality of source images may be captured at different times, different lighting conditions, or different camera poses; thus, the respective source images may not be matched perfectly. In these examples, the common features and the background object can be determined probabilistically, e.g., a respective accuracy level, which indicates a probability that a respective common feature represents a background object on the road, can be assigned to each of the common features. As an example, a low accuracy level may indicate false identification of a given background object that may be non-existent. Further, the reference image, generated from merging the plurality of source images, may be assigned an accuracy level that is indicative of a degree of accuracy of the reference image in depicting the road and the background objects on the road; in other words, the accuracy level assigned to the reference image may be indicative of robustness of estimating the background objects on the road using the reference image.

At block 304, the method 300 includes comparing the image to the reference image. To detect an obstacle on the road, the computing device may be configured to compare the image captured at a current location of the vehicle to a corresponding reference image. In examples, the computing device may be configured to identify the reference image corresponding to the image captured at the current location of the vehicle based on the current location and orientation of the vehicle. For instance, a Global Position System (GPS) module may be coupled to the vehicle and may be configured to provide, to the computing device, location information relating to a current geographic location (i.e., with respect to the Earth, using satellite-based positioning data) of the vehicle on the road. Based on the location information, the computing device may be configured to determine latitude and longitude of the current geographic location of the vehicle. Additionally or alternatively, an Inertial Measurement Unit (IMU) may be coupled to the vehicle and may be configured to provide to the computing device orientation information associated with position and orientation changes (e.g., yaw angle) of the vehicle based on inertial acceleration. Based on the location information and orientation information, the computing device may be configured to identify the reference image, or a portion of a given reference image, corresponding to the image captured at the current location of the vehicle.

Comparing a first image to a second image may be done effectively in applications where a given camera capturing the first and second images has fixed position. A vehicle, however, is a moving platform. In an example, an image captured by a camera coupled to and moving with the vehicle may not match the reference image depicting the background objects, since the image and the reference image may not have been captured from the same camera pose or lighting condition. Therefore, comparing the image to the reference image in this case may require more computational processing of the image and/or the reference image than in the case of images captured by a fixed camera.

In some examples, the image may be captured while the vehicle is moving at a certain speed; however, the reference image may have been captured by the vehicle or other vehicles while moving at a different speed. In these examples, the computing device may be configured to identify a frame in a sequence of reference images (or a video) that correspond to a frame in a sequence of images (or a video) captured at a current location of the vehicle taking into account the difference in speed.

For instance, the vehicle that may have captured the reference sequence of images may have been moving at a first speed, while the vehicle currently capturing the sequence of images at the current location of the vehicle may be moving at a second speed. Based on a respective speed of a respective vehicle, a period of time taken by the vehicle that captured the reference sequence of images to drive over a given portion of the road may be different than a respective period of time taken by the vehicle currently capturing the sequence of images to drive over the given portion of the road. Also, the camera may be capturing images at a certain rate, i.e., a certain number of frames per second. In this manner, for the given portion of the road, a number of frames in the reference sequence of images may be different from a respective number of frames in the sequence of images currently being captured.

The computing device may thus be configured to compensate for such difference in vehicle dynamics (e.g., compensate for a difference between the first and second speeds) and identify a reference frame corresponding to a given frame captured at the given location of the vehicle. For example, the reference sequence of images may be tagged with speed or dynamic characteristics of the vehicle capturing the reference sequence of images. Based on the difference in vehicle dynamics and the rate of capturing frames, the computing device may be configured to determine the corresponding reference frame that may have been captured at a nearest position to that of the frame captured at the current location of the vehicle.

In still other examples, the image and the reference image may be misaligned, i.e., the image and the reference image may not be spatially properly aligned. For example, the image may be translated (shifted) or rotated with respect to the corresponding reference image. Such misalignment may preclude the computing device from identifying obstacles on the road. Additionally or alternatively, because of misalignment, the computing device may falsely identify portions of the image as obstacles, while the portions may not represent actual existent obstacles.

Several factors may cause spatial misalignment between the image and the corresponding reference image. For example, the image may be captured from a given camera pose (e.g., a combination of position and orientation of the image-capture device relative to the road), while the reference image may have been captured from another vehicle and/or from a different camera pose. This difference in camera pose may impede alignment of the image with the reference image.

Figure 4A:
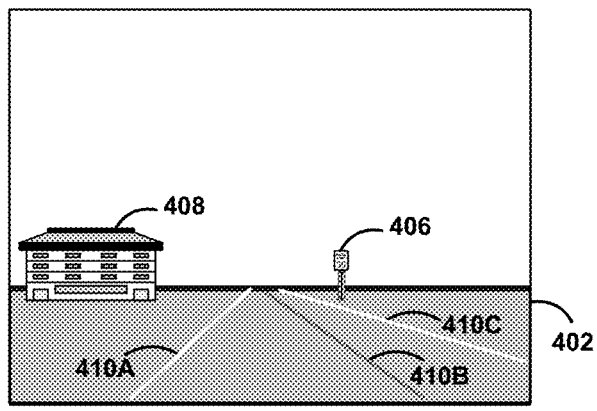
FIG. 4A illustrates a reference image of a road captured from a first camera pose, in accordance with an example embodiment.
Figure 4B:
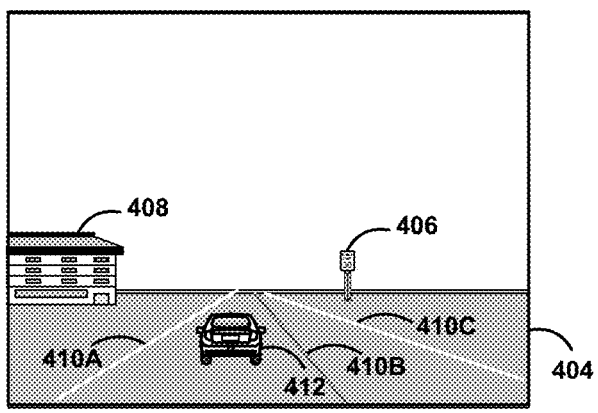
FIG. 4B illustrates an image of the road captured from a second camera pose, in accordance with an example embodiment.

FIG. 4A illustrates a reference image 402 of the road captured from a first camera pose, in accordance with an example embodiment, and FIG. 4B illustrates an image 404 of the road captured from a second camera pose, in accordance with an example embodiment. The reference image 402 depicts background objects such as traffic sign 406, building 408, and lane markers 410A, 410B, and 410C. The image 404 depicts the background objects in addition to a vehicle 412. The reference image 402 is captured from the first camera pose that is different from the second camera pose from which the image 404 is captured. FIG. 4B illustrates that the image 404 is shifted, as an example, compared to the reference image 402 in FIG. 4A. The shift may have been caused by the difference in camera pose, i.e., the vehicle or the image-capture device used to capture the reference image 402 may have been shifted relative to the road compared to the vehicle or the image-capture device used to capture the image 404.

In order to facilitate comparison of the image 404 to the reference image 402 and detection of actual obstacles on the road, the computing device may be configured to align the image 404 with the reference image 402. In one example, to align the image 404 with the reference image 402, the computing device may be configured to determine a transform that, when applied to pixels of the image 404 or pixels of the reference image 402, may cause the respective image to shift and/or rotate, and thus cause the image 404 to be aligned with the reference image 402.

In another example, the computing device may be configured to determine an object in the image 404 and a corresponding object in the reference image 402. Based on a difference in location of the object in the image 404 with respect to location of the corresponding object in the reference image 402, the computing device may be configured to determine the transform. In still another example, the computing device may be configured to infer respective camera poses from which the image 404 and the reference image 402 have been captured, and based on a difference in the respective camera poses, the computing device may be configured to determine the transform.

As an example for illustration, a pixel in the reference image 404 may be denoted by a vector representing two coordinates of a location of the pixel in two-dimensional space (X and Y). The transform, for example, may include a matrix with elements of the matrix being a function of shift (translation in either X or Y or both) and/or rotation of the reference image 402 relative to the image 404, for example. When the transform (i.e., the matrix) is applied to the pixel, the pixel is spatially aligned to a corresponding pixel in the image 404. Thus, when the transform is applied to pixels of the reference image 402, the reference image 402 may be aligned with the image 404, i.e., application of the transform may compensate for the shift and/or rotation.

Referring back to FIG. 3, at block 306, the method 300 includes identifying, based on the comparing, a difference between the image and the reference image. After determining the reference image corresponding to the image and, in some instances, aligning the reference image with the image, the computing device may be configured to compare the image to the reference image to determine obstacles on the road. For example, the computing device may be configured to subtract, from the image, background objects depicted in the reference image to determine foreground objects such as a moving object, an obstacle, or a road change.

Figure 4C:
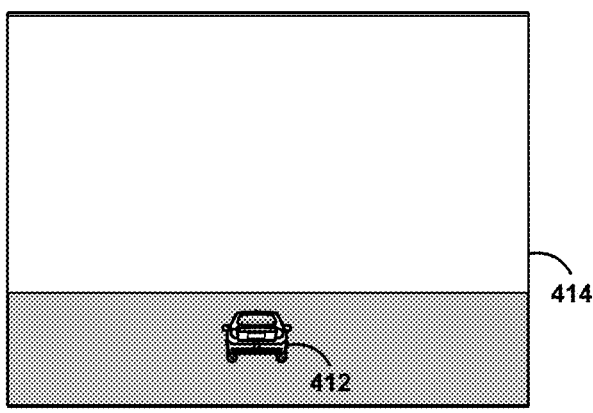
FIG. 4C illustrates the image of FIG. 4B after subtracting background objects depicted in the reference image of FIG. 4A, in accordance with an example embodiment.

FIG. 4C illustrates the image 404 of FIG. 4B after subtracting the background objects depicted in the reference image 402 of FIG. 4A, in accordance with an example embodiment. FIG. 4C shows an image 414 that may be obtained by aligning the image 404 with the reference image 402 and subtracting the background objects, such as the traffic sign 406, the building 408, and the lane markers 410A-C, from the image 404. In this manner, the computing device may be configured to determine a foreground object such as the vehicle 412. Although FIG. 4C depicts road surface after subtracting background objects, in some examples the road surface may be subtracted as a background object as well.

Referring back to FIG. 3, at block 308, the method 300 includes determining a level of confidence for identification of the difference. As described above, the reference image may be determined based on merging several source images and may be assigned an accuracy level indicative of a level of accuracy of the reference image in depicting the background object or the road. Furthermore, differences in lighting conditions and respective camera poses between the image and the reference image may cause imperfect matching of the image to the reference image. Therefore, in addition to identifying a given difference between the image and the reference image, a level of confidence can be assigned to identification of the difference. The computing device may be configured to determine the level of confidence based on the accuracy level assigned to the reference image and also based on differences in lighting conditions and respective camera pose, or any other factor, between the image and the reference image. In examples, the level of confidence may be associated with identification of the difference and/or identification of a type of the difference (e.g., a type of obstacle represented by the difference such as whether the difference is a moving object, a road change, etc.).

In one example, if the accuracy level assigned to the reference image is high, the computing device may be able to accurately subtract the background object to identify the difference with a high level of confidence. In this example, the computing device may be configured to modify the image (e.g., increase intensity of pixels representing the difference) to more accurately determine nature of the difference or what type of an obstacle is represented by the difference. In contrast, if the accuracy level assigned to the reference image is low, the computing device may not be able to accurately determine and subtract the background object. In such an instance, the computing device may be configured to assign a low level of confidence to an identified difference between the image and the reference image.

In another example, the computing device may be configured to determine a clarity metric for an identified difference. The clarity metric, for example, may be a function of clarity of the difference between the image and the reference image, or a function of intensity of pixels representing the difference. The level of confidence may be a function of the clarity metric, for example.

In still another example, the computing device may be configured to identify the difference and determine features such as geometry, boundary, etc., to estimate an obstacle represented by the difference. In some examples, the difference may represent an actual obstacle; however, in other examples, the difference may arise from tree shadows or lens flare of the image-capture device, etc. The computing device may be configured to use a probabilistic model (e.g., a Gaussian distribution) to model uncertainty of estimated geometries and boundaries. Further, the computing device may be configured to determine or assign the level of confidence for the estimation based on the probability model. Thus, the level of confidence may be based on a probability that a respective difference represents an actual obstacle. As an example, a low level of confidence may indicate a high probability of false identification of a given obstacle that may be non-existent.

In another example, the computing device may be configured to generate a probabilistic model (e.g., a Gaussian distribution), based on information relating to identifying of the difference, to determine the level of confidence. For example, the level of confidence may be determined as a function of a set of parameter values that are determined based on the features associated with the identified difference between the image and the reference image. In this example, the level of confidence may be defined as equal to the probability of an observed outcome (existence of a difference and/or the type of the difference) given those parameter values.

The level of confidence could be expressed qualitatively, such as a "low," "medium," or "high" level of confidence. Alternatively, the level of confidence could be expressed quantitatively, such as a number on a scale. Other examples are possible.

At block 310, the method 300 includes modifying, using the computing device, a control strategy associated with a driving behavior of the vehicle, based on the difference and the level of confidence. The control system of the vehicle may support multiple control strategies and associated driving behaviors that may be predetermined or adaptive to changes in a driving environment of the vehicle. Generally, a control strategy may comprise sets of rules associated with traffic interactions in various driving contexts such as approaching an obstacle (e.g., another vehicle, an accident site, road changes, etc.). The control strategy may comprise rules that determine a speed of the vehicle and a lane that the vehicle may travel on while taking into account safety and traffic rules and concerns (e.g., changes in road geometry, vehicles stopped at an intersection and windows-of-opportunity in yield situation, lane tracking, speed control, distance from other vehicles on the road, passing other vehicles, and queuing in stop-and-go traffic, and avoiding areas that may result in unsafe behavior such as oncoming-traffic lanes, etc.). For instance, in approaching an obstacle, the computing device may be configured to modify or select, based on the identified obstacle and the level of confidence, a control strategy comprising rules for actions that control the vehicle speed to safely maintain a distance with other objects and select a lane that is considered safest given the existence of the obstacle.

As an example, in FIGS. 4A-4C, if the level of confidence assigned to identification of the vehicle 412 as a difference between the image and the reference image is high (e.g., exceeds a predetermined threshold), the computing device may be configured to utilize sensor information to track the vehicle 412 and make navigation decisions based on driving behavior of the vehicle 412.

In an example, a first control strategy may comprise a default driving behavior and a second control strategy may comprise a defensive driving behavior. Characteristics of a the defensive driving behavior may comprise, for example, following another vehicle maintaining a predetermined safe distance with the other vehicle that may be larger than a distance maintained in the default driving behavior, turning-on lights, reducing a speed of the vehicle, or stopping the vehicle. In this example, the computing device may have identified an obstacle (e.g., an accident site) and may be configured to compare the determined level of confidence of identification of the obstacle to a threshold level of confidence, and the computing device may be configured to select the first or the second control strategy, based on the comparison. For example, if the determined level of confidence is greater than the threshold, the computing device may be configured to select the second driving behavior (e.g., the defensive driving behavior). If the determined level of confidence is less than the threshold, the computing device may be configured to modify the control strategy to the first control strategy (e.g., select the default driving behavior).

In yet another example, alternatively or in addition to transition between discrete control strategies (e.g., the first control strategy and the second control strategy) the computing device may be configured to select from a continuum of driving modes or states based on the determined level of confidence. In still another example, the computing device may be configured to select a discrete control strategy and also may be configured to select a driving mode from a continuum of driving modes within the selected discrete control strategy. In this example, a given control strategy may comprise multiple sets of driving rules, where a set of driving rules describe actions for control of speed and direction of the vehicle. The computing device further may be configured to cause a smooth transition from a given set of driving rules to another set of driving rules of the multiple sets of driving rules, based on a type of the identified difference (e.g., vehicle, static object, accident site, road changes, etc.) and the level of confidence. A smooth transition may indicate that the transition from the given set of rules to another may not be perceived by a passenger in the vehicle as a sudden or jerky change in a speed or direction of the vehicle, for example.

In an example, a given control strategy may comprise a program or computer instructions that characterize actuators controlling the vehicle (e.g., throttle, steering gear, brake, accelerator, or transmission shifter) based on the determined level of confidence. The given control strategy may include action sets ranked by priority, and the action sets may include alternative actions that the vehicle may take to accomplish a task (e.g., driving from one location to another). The alternative actions may be ranked based on the identified difference between the image and the reference image (e.g., based on a type of obstacle identified), and the level of confidence of the identification, for example. Also, the computing device may be configured to select an action to be performed and, optionally, modified based on the level of confidence.

In another example, multiple control strategies (e.g., programs) may continuously propose actions to the computing device. The computing device may be configured to decide which strategy may be selected or may be configured to modify the control strategy based on a weighted set of goals (safety, speed, etc.), for example. Weights of the weighted set of goals may be a function of the type of the identified difference and/or the level of confidence. Based on an evaluation of the weighted set of goals, the computing device, for example, may be configured to rank the multiple control strategies and respective action sets and select or modify a given strategy and a respective action set based on the ranking.

These examples and driving situations are for illustration only. Other examples and control strategies and driving behaviors are possible as well.

Referring back to FIG. 3, at block 312, the method 300 includes controlling, using the computing device, the vehicle based on the modified control strategy. In an example, the computing device may be configured to control actuators of the vehicle using an action set or rule set associated with the modified control strategy. For instance, the computing device may be configured to adjust translational velocity, or rotational velocity, or both, of the vehicle based on the modified driving behavior. As an example, referring to FIGS. 4A-4C, based on identifying the vehicle 412 with a high level of confidence, the computing device may be configured to cause the vehicle controlled by the computing device to follow the vehicle 412, while maintaining a predetermined safe distance with the vehicle 412.

In another example, the computing device may have detected an obstacle (e.g., a stopped vehicle or an accident site) based on a comparison of the image 404 to the reference image 402, and may have determined a high level of confidence for the identification. In this example, the computing device may be configured to control the vehicle according to a defensive driving behavior to safely navigate around the obstacle. For instance, the computing device may be configured to reduce speed of the vehicle, cause the vehicle to change lanes, and/or shift to a position behind and follow another vehicle while keeping a predetermined safe distance.

These control actions and driving situations are for illustration only. Other actions and situations are possible as well. In one example, the computing device may be configured to control the vehicle based on the modified control strategy as an interim control until a human driver can take control of the vehicle.

In some embodiments, the disclosed methods may be implemented as computer program instructions encoded on a computer-readable storage media in a machine-readable format, or on other non-transitory media or articles of manufacture. FIG. 5 is a schematic illustrating a conceptual partial view of an example computer program product 500 that includes a computer program for executing a computer process on a computing device, arranged according to at least some embodiments presented herein. In one embodiment, the example computer program product 500 is provided using a signal bearing medium 501. The signal bearing medium 501 may include one or more program instructions 502 that, when executed by one or more processors (e.g., processor 113 in the computing device 111) may provide functionality or portions of the functionality described above with respect to FIGS. 1-4. Thus, for example, referring to the embodiments shown in FIG. 3, one or more features of blocks 302-312 may be undertaken by one or more instructions associated with the signal bearing medium 501. In addition, the program instructions 502 in FIG. 5 describe example instructions as well.

In some examples, the signal bearing medium 501 may encompass a computer-readable medium 503, such as, but not limited to, a hard disk drive, a Compact Disc (CD), a Digital Video Disk (DVD), a digital tape, memory, etc. In some implementations, the signal bearing medium 501 may encompass a computer recordable medium 504, such as, but not limited to, memory, read/write (R/W) CDs, R/W DVDs, etc. In some implementations, the signal bearing medium 501 may encompass a communications medium 505, such as, but not limited to, a digital and/or an analog communication medium (e.g., a fiber optic cable, a waveguide, a wired communications link, a wireless communication link, etc.). Thus, for example, the signal bearing medium 501 may be conveyed by a wireless form of the communications medium 505 (e.g., a wireless communications medium conforming to the IEEE 802.11 standard or other transmission protocol).

The one or more programming instructions 502 may be, for example, computer executable and/or logic implemented instructions. In some examples, a computing device such as the computing device described with respect to FIGS. 1-4 may be configured to provide various operations, functions, or actions in response to the programming instructions 502 conveyed to the computing device by one or more of the computer readable medium 503, the computer recordable medium 504, and/or the communications medium 505. It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A method, comprising:
obtaining a plurality of source images associated with a road on which a vehicle is traveling;
comparing respective source images of the plurality of source images;
extracting one or more features common to the plurality of source images;
identifying, based on the one or more common features, one or more background objects associated with the road;
combining the plurality of source images to generate a reference image depicting the one or more background objects;
assigning an accuracy level to the reference image, wherein the accuracy level is indicative of a degree of accuracy of the reference image in depicting the one or more background objects associated with the road;
receiving, at a computing device, from a camera coupled to the vehicle, an image of the road;
comparing the image to the reference image to identify a difference between the image and the reference image;
identifying, based on the difference, a foreground object in the image; and
controlling, using the computing device, the vehicle based on (i) the accuracy level assigned to the reference image and (ii) the identified foreground object.

2. The method of claim 1, wherein merging the plurality of source images further comprises capturing the source images from a plurality of camera poses.

3. The method of claim 1, wherein extracting the one or more features common to the plurality of source images comprises assigning an accuracy level to each feature common to the plurality of source images.

4. The method of claim 1, further comprising identifying the reference image based on location information indicative of a current location of the vehicle received from a global positioning system module and orientation information indicative of a current orientation of the vehicle received from an internal measurement unit.

5. The method of claim 4, wherein identifying the reference image is further based on a tag associated with the reference image that indicates a speed of the vehicle at the time the reference image was captured.

6. The method of claim 1, further comprising determining a level of confidence for identification of the foreground object.

7. The method of claim 6, wherein the level of confidence is based on the accuracy level assigned to the reference image.

8. The method of claim 6, further comprising determining an object type for the foreground object, wherein controlling the vehicle comprises:
   selecting at least one action of a plurality of actions ranked based on the object type of the foreground object and the level of confidence;
   modifying a control strategy associated with a driving behaviour of the vehicle based on the selected at least one action; and
   controlling the vehicle based on the modified control strategy.

9. The method of claim 6, further comprising determining an object type for the foreground object, wherein determining the object type of the foreground object comprises identifying the foreground object as a vehicle, the method further comprising:
   comparing the level of confidence to a predetermined threshold;
   determining that the level of confidence meets or exceeds the predetermined threshold; and
   based on the determination that the level of confidence meets or exceeds the predetermined threshold, using sensor information to track the identified vehicle, wherein controlling the vehicle comprises navigating the vehicle based on the sensor information used to track the identified vehicle.

10. The method of claim 6, wherein the image is captured from a first camera pose, and the reference image is captured from a second camera pose, and wherein the level of confidence is determined based on a closeness of the first camera pose to the second camera pose and the accuracy level of reference image.

11. The method of claim 10, wherein comparing the image to the reference image comprises:
   determining a transform based on the first camera pose and the second camera pose; and
   applying the transform to align the reference image to the image.

12. The method of claim 1, wherein identifying the foreground object comprises identifying one or more of (i) a moving object, (ii) an obstacle, and (iii) a road change.

13. The method of claim 1, further comprising receiving a plurality of images of the road on which the vehicle is travelling, and estimating a relative speed of the foreground object based on a speed of the vehicle and a comparison of respective positions of the foreground object in at least two images of the plurality of images.

14. The method of claim 1, further comprising estimating a relative speed of the foreground object based on a speed of the vehicle and information received from at least one of a radio detection and ranging (RADAR) unit or a light detection and ranging (LIDAR) unit.

15. A non-transitory computer readable medium having stored thereon instructions executable by a computing device to cause the computing device to perform functions comprising:
   obtaining a plurality of source images associated with a road on which a vehicle is traveling;
   comparing respective source images of the plurality of source images;
   extracting one or more features common to the plurality of source images;
   identifying, based on the one or more common features, one or more background objects associated with the road;
   combining the plurality of source images to generate a reference image depicting the one or more background objects;
   assigning an accuracy level to the reference image, wherein the accuracy level is indicative of a degree of accuracy of the reference image in depicting the one or more background objects associated with the road;
   receiving, from a camera coupled to the vehicle, an image of the road;
   comparing the image to the reference image to identify a difference between the image and the reference image;
   identifying, based on the difference, a foreground object in the image; and
   controlling the vehicle based on (i) the accuracy level assigned to the reference image and (ii) the identified foreground object.

16. The non-transitory computer readable medium of claim 15, wherein extracting the one or more features common to the plurality of source images comprises assigning an accuracy level to each feature common to the plurality of source images.

17. The non-transitory computer readable medium of claim 15, the functions further comprising determining a level of confidence for identification of the foreground object, wherein the level of confidence is based on the accuracy level assigned to the reference image.

18. The non-transitory computer readable medium of claim 15, the functions further comprising:
   determining a level of confidence for identification of the foreground object; and
   determining an object type for the foreground object, wherein controlling the vehicle comprises:
   selecting at least one action of a plurality of actions ranked based on the object type of the foreground object and the level of confidence;
   modifying a control strategy associated with a driving behaviour of the vehicle based on the selected at least one action; and
   controlling the vehicle based on the modified control strategy.

19. The non-transitory computer readable medium of claim 15, the functions further comprising:
   identifying an object type of the foreground object;
   determining a level of confidence for identification of the foreground object comparing the level of confidence to a predetermined threshold;
   determining that the level of confidence meets or exceeds the predetermined threshold; and
   based on the determination that the level of confidence meets or exceeds the predetermined threshold, using sensor information to track the foreground object, wherein controlling the vehicle comprises navigating the vehicle based on the sensor information used to track the identified foreground object.

20. A control system for a vehicle, comprising:
   an image-capture device; and
   a computing device in communication with the image-capture device and configured to:
   obtain a plurality of source images associated with a road on which a vehicle is traveling;
   compare respective source images of the plurality of source images;
   extract one or more features common to the plurality of source images;

identify, based on the one or more common features, one or more background objects associated with the road;

combine the plurality of source images to generate a reference image depicting the one or more background objects;

assign an accuracy level to the reference image, wherein the accuracy level is indicative of a degree of accuracy of the reference image in depicting the one or more background objects associated with the road;

receive, from a camera coupled to the vehicle, an image of the road;

compare the image to the reference image to identify a difference between the image and the reference image;

identify, based on the difference, a foreground object in the image; and control the vehicle based on (i) the accuracy level assigned to the reference image and (ii) the identified foreground object.

\* \* \* \* \*